United States Patent
Trautenberg

(10) Patent No.: US 9,429,654 B2
(45) Date of Patent: Aug. 30, 2016

(54) ENHANCEMENT OF THE INTEGRITY CONCEPT OF A SATELLITE NAVIGATION SYSTEM

(71) Applicant: Astrium GmbH, Taufkirchen (DE)

(72) Inventor: Hans Trautenberg, Cologne (DE)

(73) Assignee: Astrium GmbH, Taufkirchen (DE)

( * ) Notice: Subject to any disclaimer, the term of this patent is extended or adjusted under 35 U.S.C. 154(b) by 627 days.

(21) Appl. No.: 13/859,787

(22) Filed: Apr. 10, 2013

(65) Prior Publication Data

US 2013/0271315 A1    Oct. 17, 2013

(30) Foreign Application Priority Data

Apr. 12, 2012  (DE) .................... 10 2012 007 191

(51) Int. Cl.
  *G01S 19/20*   (2010.01)
(52) U.S. Cl.
  CPC ..................... *G01S 19/20* (2013.01)
(58) Field of Classification Search
  CPC ............................... G01S 19/20; G01S 19/08
  USPC ....................................... 342/357.58, 357.45
  See application file for complete search history.

(56) References Cited

U.S. PATENT DOCUMENTS

| | | | | |
|---|---|---|---|---|
| 5,760,737 A * | 6/1998 | Brenner | ............... | G01C 21/165 |
| | | | | 342/357.58 |
| 2008/0074318 A1* | 3/2008 | Trautenberg | ............ | G01S 19/08 |
| | | | | 342/357.45 |
| 2010/0052979 A1* | 3/2010 | Trautenberg | ............ | G01S 19/08 |
| | | | | 342/357.48 |
| 2010/0156720 A1* | 6/2010 | Daubrawa | ............... | G01S 19/08 |
| | | | | 342/357.64 |
| 2010/0289696 A1* | 11/2010 | Krueger | .................. | G01S 19/20 |
| | | | | 342/357.58 |

FOREIGN PATENT DOCUMENTS

| | | | | |
|---|---|---|---|---|
| DE | EP 2402785 A1 * | 1/2012 | ............. | G01S 19/20 |
| EP | 1 637 899 A1 | 3/2006 | | |
| EP | 1 792 196 B1 | 11/2008 | | |
| EP | 2 402 785 A1 | 1/2012 | | |

OTHER PUBLICATIONS

V. Oehler, F. Luongo, H. Trautenberg, J.-P. Boyero, J. Krueger, T. Rang: "The Galileo Integrity Concept and Performance", Galileo-Industries GmbH, Proceedings ENC GNSS 2005, Munich, Germany, Jul. 2005.*

(Continued)

*Primary Examiner* — Gregory C Issing
*Assistant Examiner* — Helena Seraydaryan
(74) *Attorney, Agent, or Firm* — Crowell & Moring LLP

(57) ABSTRACT

A method for determining the integrity risk at an alert limit of a position solution determined with a satellite navigation system involves calculating a first integrity risk at the alert limit assuming that one satellite j of the satellites is faulty. A first position solution is determined with the signals from all of the satellites and a second position solution is determined with the signals from all of the satellites except for the signal received from the satellite j. A difference between the first and the second position solution is identified and subtracted from the alert limit to create a reduced alert limit. A second integrity risk at the reduced alert limit is calculated with the signals received from all satellites except the signal received from the satellite j. The integrity risk at the alert limit is determined using the minimum of the first and second integrity risks.

14 Claims, 2 Drawing Sheets

(56) References Cited

OTHER PUBLICATIONS

Figure 1:
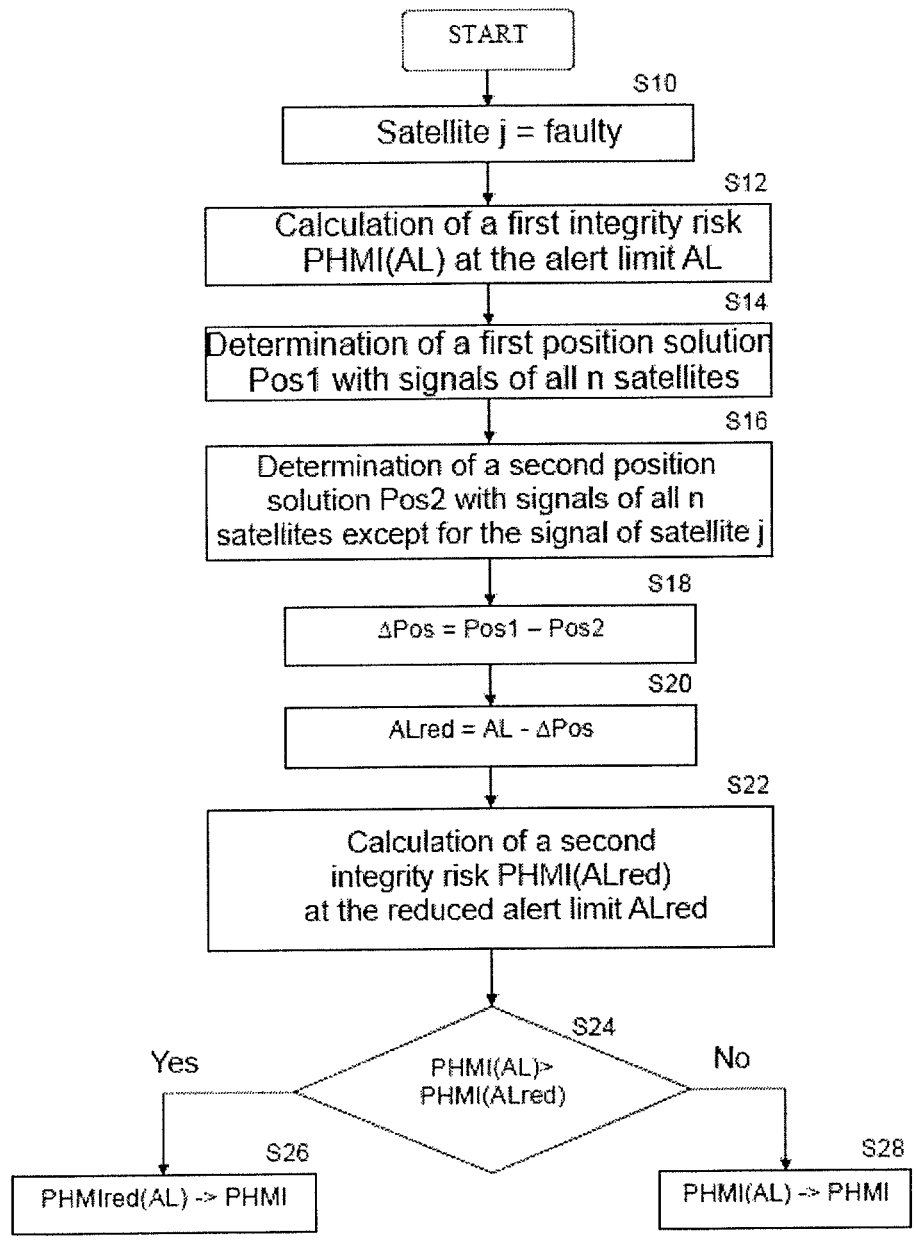

German-language European Search Report dated Mar. 10, 2015, including partial English translation (seven (7) pages).

Oehler et al., "The Galileo Integrity Concept," International Technical Meeting of the Satellite Division of the Institute of Navigation, Sep. 21, 2004, pp. 604-615, ION GNSS, Washington, DC, US (XP002375520).

* cited by examiner

ENHANCEMENT OF THE INTEGRITY CONCEPT OF A SATELLITE NAVIGATION SYSTEM

CROSS-REFERENCE TO RELATED APPLICATIONS

This application claims priority under 35 U.S.C. §119 to German Patent Application No. 10 2012 007 191.4, filed Apr. 12, 2012, the entire disclosure of which is herein expressly incorporated by reference.

BACKGROUND AND SUMMARY OF THE INVENTION

Exemplary embodiments of the present invention relate to a method and an apparatus for determining the integrity risk of an alert limit of a position solution determined with a satellite navigation system.

Integrity is becoming increasingly important for satellite navigation systems, especially for safety-critical applications such as flight navigation based on satellite navigation. One concept for providing integrity in a satellite navigation system is to continuously monitor the satellites from the ground and to transmit data about the monitored satellites, for example, to user systems of the satellite navigation system with the navigation signals output by the satellites. These data can make it possible for a user system to calculate its individual integrity risk and to output a warning or cancel a navigation operation or not even to begin one.

The data on the monitored satellites may be statistical descriptions of properties of the SIS (signals in space) signals emitted from the satellites. In particular, the statistical descriptions may be distributions of SIS errors so that a user system may estimate an integrity risk using this distribution.

For instance, in the future European Galileo satellite navigation system there will be an integrity data stream that makes it possible to signal system or satellite failures to user systems. In particular, faulty satellite signals may be provided with integrity warnings (system warning mechanism). It will also be possible to transmit statistical descriptions of SIS properties with the integrity data stream so that user systems may determine their integrity risk (user integrity concept).

The integrity concept for Galileo and its principles are described in detail in "The Galileo Integrity Concept," V. Oehler, F. Luongo, J.-P. Boyero, R. Stalford, H. L. Trautenberg, ION GNSS 17th International Technical Meeting of the Satellite Division, Sep. 21-24, 2004, Long Beach, Calif., in published European patent application EP 1 637 899 A1 and granted European patent EP 1 792 196 B1. Helpful details of the Galileo integrity concept shall be explained again in the following to enhance understanding of the present invention.

The Galileo integrity concept provides that the "processing facility" for the ground segment of Galileo makes a prediction about the accuracy of navigation signals. This prediction is a statistical description of the signal error and is called an expected signal error or Signal in Space Accuracy (SISA).

The actual errors of the individual navigation signals transmitted by satellites, or Signal in Space Errors (SISE), are estimated by observations made by the monitoring network of the Galileo system. The estimated errors are called estimated SISE (eSISE).

With respect to the Galileo integrity concept, a satellite is set to not usable via an alert (IF: Integrity Flag) as soon as the estimated signal error (eSISE) for this satellite is greater than an integrity alert threshold (TH: Threshold). Such alerts are transmitted to Galileo's user systems as system warnings.

Since the estimated eSISE for the SISE is an error-prone process, as a rule it is assumed that the distribution of the current SISE about the value of the estimated SISE (eSISE) may be described with a Gaussian distribution with the standard deviation, which is called the Signal In Space Monitoring Accuracy (SISMA). Consequently SISMA represents a statistical description of the accuracy of the estimated eSISE for the SISE for a satellite.

The Galileo integrity concept also provides for transmitting the two statistical descriptions, SISA and SISMA, to user systems that may then use these values to calculate their individual integrity risk in terms of the user integrity concept.

For the Galileo integrity concept and calculating the integrity risk it is now assumed for each satellite that a satellite is in one of the following modes:

Mode 1: The satellite is fault-free and the statistical description of the fault-free satellite is also correct. In the case of Galileo, this means that the fault probability distribution of the satellite is overbounded by the SISA value of Galileo.

Mode 2: The satellite is faulty and with respect to the statistical description of the faulty satellite it is assumed that the satellite has a positive or negative basic fault of the magnitude TH, the entire fault is composed of the basic fault and one additional fault, and in the case of Galileo the probability distribution of the additional fault is overbounded by the SISMA value of Galileo. In the Galileo integrity concept, the basic fault or the integrity alert threshold TH is calculated as follows as a product of a prefactor and the root of the sum of the squares of SISA and SISMA:

$$TH = k_{pfa} \cdot \sqrt{SISA^2 + SISMA^2}$$

The prefactor $k_{pfa}$ is determined by the allowed false alert rate.

As a user integrity concept, the calculation of the integrity risk at a so-called alert limit AL proved practical for Galileo (different alert limits HAL and VAL are used for the horizontal and vertical, respectively). It is assumed that either all n satellites that a user system uses are in Mode 1 or all satellites except one are in Mode 1 and the one satellite is only in Mode 2.

The integrity risk is now calculated as the weighted mean of the n+1 possible modes (n modes 2, in which one of the n satellites is assumed to be in Mode 2, and 1 Mode 1, in which all satellites are assumed to be in Mode 1), wherein for simplification the weight for the mode condition in which all satellites are in Mode 1 is frequently assumed to be 1 and the weight for each of the other n conditions in which one satellite is in Mode 2 is assumed to be p_failed. The integrity risk from the other possible conditions of the system is taken into account with a constant additive term in the integrity risk at the alert limit. However, this leads to reduced availability when the SISMA is high.

Exemplary embodiments of the present invention are directed to increasing the availability of a position solution determined with a satellite navigation system with an integrity risk at an alert limit.

In order to increase the availability of a position solution determined with a satellite navigation system having an integrity risk at an alert limit, in accordance with the invention the unweighted contribution to the integrity risk at the alert limit under the assumption that satellite j is faulty is calculated under two different assumptions, and the minimum of the two calculated amounts is used. The first integrity risk at the alert limit is calculated using the classic assumptions that were described in the foregoing that the satellite j is assumed as described by Mode 2. The second integrity risk at the alert limit is calculated as follows: The difference between the position solution with all satellites and the position solution with the satellite j removed from the position solution is deducted from the alert limit and then the integrity risk with the n−1 satellites that are described by Mode 1 is calculated at the reduced alert limit.

One embodiment of the invention relates to a method for determining the integrity risk at an alert limit of a position solution determined with a satellite navigation system, signals received from satellites in the satellite navigation system being processed for determining a position solution and the method having the following steps:

A first integrity risk at the alert limit is calculated under the assumption that one satellite j of the satellites is faulty;

A first position solution is determined with the signals received from all of the satellites;

A second position solution is determined with the signals received from all of the satellites except for the signal received from the satellite j;

A difference between the first and the second position solution is found;

A reduced alert limit is created by subtracting the difference found from the alert limit;

A second integrity risk at the reduced alert limit is calculated with the signals received from all satellites except the signal received from the satellite j; and The integrity risk at the alert limit is determined using the minimum of the first and second integrity risks.

The integrity risk at the alert limit may be determined using the minimum of the first and second integrity risks as an unweighted contribution in accordance with the user integrity concept of the Galileo satellite navigation system.

Moreover, statistical descriptions provided by the satellite navigation system regarding signal errors of each satellite may be processed in that a basic error is determined therefrom for a faulty satellite, and this basic error is evaluated as faulty for the classification of a satellite.

It is possible to process as statistical descriptions of signal errors for each satellite the expected signal error or the Signal in Space Accuracy (SISA) value for each satellite signal, and, the accuracy of the estimate of the signal error or the Signal in Space Monitoring Accuracy (SISMA) value for each satellite signal, in that for each satellite the basic error TH is calculated according to the following equation:

$$TH = k_{pfa} \cdot \sqrt{SISA^2 + SISMA^2}$$

wherein the prefactor $K_{pfa}$ is determined by an allowed false alert rate.

Another embodiment of the invention relates to a computer program with program code for performing all method steps according to the invention and, as described in the foregoing, when the computer program is executed in a computer.

One embodiment of the invention furthermore relates to a non-transitory data carrier on which the program code of the computer program that is executable by a computer is stored as described in the foregoing.

In another embodiment, the invention relates to an apparatus for determining the integrity risk at an alert limit of a position solution determined with a satellite navigation system, the apparatus being embodied for processing signals that are received from satellites for the satellite navigation system for determining a position solution and the apparatus having the following:

first means for calculating a first integrity risk at the alert limit under the assumption that one satellite j of the satellites is faulty;

second means for determining a first position solution with the signals received from all satellites;

third means for determining a second position solution with the signals received from all satellites except the signal received from the satellite j;

fourth means for determining a difference between the first and the second position solution;

fifth means for forming a reduced alert limit by subtracting the determined difference from the alert limit;

sixth means for calculating a second integrity risk at the reduced alert limit with the signals received from all satellites except the signal received from the satellite j; and, seventh means for determining the integrity risk at the alert limit using the minimum of the first and second integrity risks.

The first through seventh means may be implemented, at least in part, by a programmable processor and a program that is stored in a memory and that is for configuring the programmable processor for performing one or a plurality of steps of a method in accordance with the invention and as described in the foregoing.

Finally, one embodiment of the invention relates to a position determination apparatus for determining a position using signals from a satellite navigation system and for determining an integrity risk at an alert limit for the determined position, the position determination apparatus having an apparatus for determining the integrity risk at an alert limit of a position solution that is determined with a satellite navigation system in accordance with the invention and as is described in the foregoing and having an output means for outputting a determined integrity risk.

The output means may especially have one or a plurality of the following means: a display unit, a data output interface, and/or an audio output unit.

Additional advantages and application options for the present invention result from the following description in conjunction with the exemplary embodiments depicted in the drawings.

The terms used in the list of reference numbers included at the end of this specification and the associated reference numbers are used in the description, claims, abstract, and drawings.

BRIEF DESCRIPTION OF THE DRAWING FIGURES

Figure 2:
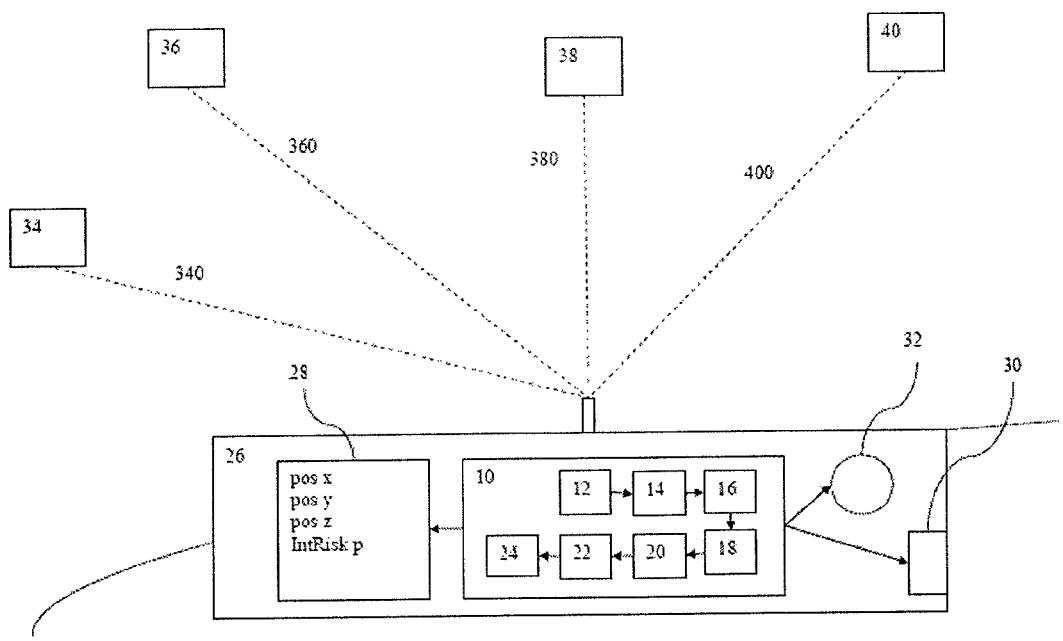

In the drawings:

FIG. 1 is a flow chart for one exemplary embodiment of a method for determining the integrity risk at an alert limit of a position solution determined with a satellite navigation system in accordance with the invention, and FIG. 2 is a circuit diagram for a position determination apparatus in accordance with the invention that receives signals from four satellites in a satellite navigation system and evaluates them to determine a position.

In the following specification, identical, functionally equivalent, and functionally associated elements may be provided with the same reference number. Absolute values are provided only as examples in the following and shall not be construed to be limiting for the invention.

DETAILED DESCRIPTION

FIG. 1 depicts in a flow chart the sequence for the inventive method for determining the integrity risk at an alert limit of a position solution determined with a satellite navigation system. The individual steps of the method shall now be explained in the following in conjunction with the situation depicted in FIG. 2, in which a position determination apparatus 26, for instance a navigation apparatus for aircraft, receives signals 340, 360, 380, and 400 from four satellites 34, 36, 38, and 40 in a satellite navigation system such as Galileo and processes them for determining the position and determining an integrity risk at an alert limit.

The usual data that are provided by satellite navigation systems for determining position, such as transmit time, orbit data for the transmitting satellite, ephemerides for all satellites, etc. are transmitted with the signals 340, 360, 380, and 400. Furthermore, as for Galileo integrity data such as SISA and SISMA of the satellite signals are transmitted with the signals in an integrity data stream.

The position determination apparatus 26 includes a receiver (not explicitly illustrated) for the signals 340, 360, 380, and 400, which receiver decodes the data transmitted with the signals in the usual manner, known per se, and provides them for further processing, especially for position determination using a controller (not shown). To this end the controller is configured so that it determines the current position of the apparatus 26 using the data. In the context of the present invention, the position thus determined is called the position solution.

In addition, the apparatus 26 has an apparatus 10 for determining the integrity risk at an alert limit. The apparatus 10 may be implemented for instance in hardware in the form of an integrated circuit, or by a programmable processor that is configured by software implementing the inventive method such that the processor can determine the integrity risk at an alert limit in accordance with the invention. The apparatus may also be principally realized by the controller that is provided for determining the position solution. In this case firmware of the position determination apparatus 26 may be embodied for instance such that it includes additional functions for determining the integrity risk at an alert limit.

The apparatus 10 implements a plurality of functions of an algorithm for determining the integrity risk at an alert limit and shall now be described with reference to the flow chart depicted in FIG. 1.

In step S10 the algorithm determines a satellite j that is assumed to be faulty, i.e. it is in Mode 2 in accordance with the Galileo integrity concept described in the foregoing. For the rest of the explanation it shall be assumed that the satellite 36 is assumed to be faulty. For classifying a satellite as faulty, for instance the SISA and SISMA values may be evaluated; these are determined by the ground segment of the satellite navigation system and transmitted with the integrity data stream. For instance, using the SISA and SISMA values for each satellite the corresponding basic error TH is calculated in accordance with the following equation:

$$TH = k_{pfa} \cdot \sqrt{SISA^2 + SISMA^2}$$

wherein the prefactor $k_{pfa}$ is determined by an allowable false alert rate. The satellite with the greatest basic fault may then be selected as the faulty satellite.

Then, using the assumption of the faulty satellite 36 in step S12 the algorithm calculates a first integrity risk PHMI (AL) at a previously established alert limit AL, which for instance may especially be prespecified by a user, depending on the application, in which the position solution is to be used. The integrity risk may be calculated in accordance with the Galileo user integrity concept, explained in the foregoing, as it is described in detail in the publication, "The Galileo Integrity Concept," V. Oehler, F. Luongo, J.-P. Boyero, R. Stalford, H. L. Trautenberg, ION GNSS 17th International Technical Meeting of the Satellite Division, Sep. 21-24, 2004, Long Beach, Calif., in the published European patent application EP 1 637 899 A1, and in the granted European patent EP 1 792 196 B1. To this end, first integrity calculation means 12, which may be implemented for instance in the form of a special calculating unit in hardware or in software, are provided in the apparatus 10.

In the next step S14 a first position solution Pos1 is determined with the signals 340, 360, 380, and 400 received from all four satellites 34, 36, 28, and 40, that is, including the signal 360 from the satellite 36, which has been classified as faulty. The step S14 may be executed in the apparatus 10 using a first position determination means 14, which itself may be implemented in hardware or software.

In step S16, a second position solution Pos2 is furthermore determined without the signal 360 from the satellite 36 that was classified as faulty, that is, with only the three signals 340, 380, and 400 from the satellites 34, 38, and 40. Second position determination means 16, which may be implemented in hardware or software, may also be provided for step S16.

Both the first and the second position determination means 14 and 16 may also be implemented by the aforesaid controller.

In step S18 a difference Δpos is calculated from the two determined position solutions Pos1 and Pos2. This step may be executed using position difference calculation means 18 of the apparatus 10, which may be implemented in hardware or software.

In step S20, the difference ΔPos is subtracted from the established alert limit AL so that a reduced alert limit ALred is obtained. For performing step S20, alert limit formation means 20 may be provided in the apparatus 10, implemented in hardware or software.

Now a second integrity risk PHMI(ALred) is calculated with the three satellites 34, 38, and 40 that are described by the Mode 1 at the reduced alert limit ALred in step S22, which may be executed by second integrity calculation means 22. The second integrity risk may again be determined in accordance with the Galileo user integrity concept explained in the foregoing and described in the aforesaid publications.

The minimum of the two calculated integrity risks PHMI (AL) and PHMI(ALred) are determined in the following. To this end, step S24 checks whether the first integrity risk PHMI(AL) is greater than the second integrity risk PHMI (ALred). If yes, the method is continued with step S26 and the second integrity risk PHMI(ALred) is used for determining the integrity risk at the alert limit. If the first integrity risk PHMI(AL) is less than the second integrity risk PHMI (ALred), the first integrity risk PNMI(AL) is used for determining the integrity risk at the alert limit in step S28. The steps S24, S26, and S28 may be performed by integrity risk determination means 24 of the apparatus 10 that are implemented in hardware or software.

The smaller of the two integrity risks determined by the position determination apparatus 26 as described in the foregoing may be output via output means, especially on a display device 28 such as an LCD display, via an audio output unit 32, for instance as a warning tone, and/or via a data output interface 30 for further processing by other apparatus or the control of other apparatus. For instance, controls based on satellite navigation, such as autopilot or pilot assistance systems or a system for further processing the determined position, may be included by the output integrity risk. In particular, for instance an automatic navigation at an integrity risk that is too high may be cancelled or navigation instruments that are based on satellite navigation may be switched to an operation independent of the satellite navigation if the integrity risk is too high.

The present invention makes it possible to increase the availability of a position solution determined with a satellite navigation system with an integrity risk at an alert limit in that the unweighted contribution to the integrity risk at the alert limit, under the assumption that one satellite is faulty, is calculated under two different assumptions and the minimum of the two calculated amounts is used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS AND ACRONYMS

10 Apparatus for determining the integrity risk at an alert limit
12 First integrity calculation means
14 First position determination means
16 Second position determination means
18 Position difference calculation means
20 Alert limit formation means
22 Second integrity calculation means
24 Integrity risk determination means
26 Position determination apparatus
28 Display device
30 Data output interface
32 Audio output unit
34 First satellite
340 First satellite signal
36 Second satellite
380 Second satellite signal
38 Third satellite
380 Third satellite signal
40 Fourth satellite
400 Second satellite signal

What is claimed is:

1. A method for determining an integrity risk at an alert limit of a position solution determined by processing signals received from satellites of a satellite navigation system, the method comprising:
   calculating a first integrity risk at the alert limit assuming that one satellite of the satellites is faulty;
   determining a first position solution is determined with signals received from all of the satellites;
   determining a second position solution with signals received from all of the satellites except for a signal received from the assumed faulty satellite;
   determining a difference between the first and the second position solution;
   creating a reduced alert limit by subtracting the determined difference from the alert limit;
   calculating a second integrity risk at the reduced alert limit with the signals received from all satellites except the signal received from the assumed faulty satellite;
   determining the integrity risk at the alert limit using a lower of the first and second integrity risks; and
   outputting the determined integrity risk by one of a display unit, a data output interface and an audio output unit.

2. The method in accordance with claim 1, wherein the integrity risk at the alert limit is determined using the minimum of the first and second integrity risks as an unweighted contribution in accordance with a user integrity concept of a Galileo satellite navigation system.

3. The method in accordance with claim 1, wherein statistical descriptions provided by the satellite navigation system regarding signal errors of each satellite are processed and a basic error for the assumed faulty satellite is determined therefrom, and the basic error is evaluated as faulty for classification of a satellite.

4. The method in accordance with claim 3, wherein
   an expected signal error or Signal in Space Accuracy SISA value for each satellite signal, and an accuracy of the estimate of the signal error or a Signal in Space Monitoring Accuracy SISMA value for each satellite signal are processed as statistical descriptions of signal errors for each satellite, wherein for each satellite the basic error TH is calculated according to the following equation:

$$TH = k_{pfa} \cdot \sqrt{SISA^2 + SISMA^2}$$

wherein the prefactor $K_{pfa}$ is determined by an allowed false alert rate.

5. A computer program for determining an integrity risk at an alert limit of a position solution determined by processing signals received from satellites of a satellite navigation system, wherein the computer program is stored on a non-transitory computer-readable medium, which when executed by a computer causes the computer to:
   calculate a first integrity risk at the alert limit assuming that one satellite of the satellites is faulty;
   determine a first position solution is determined with signals received from all of the satellites;
   determine a second position solution with signals received from all of the satellites except for a signal received from the assumed faulty satellite;
   determine a difference between the first and the second position solution;
   create a reduced alert limit by subtracting the determined difference from the alert limit;
   calculate a second integrity risk at the reduced alert limit with the signals received from all satellites except the signal received from the assumed faulty satellite; and
   determine the integrity risk at the alert limit using a lower of the first and second integrity risks.

6. The computer program in accordance with claim 5, wherein the integrity risk at the alert limit is determined using the minimum of the first and second integrity risks as an unweighted contribution in accordance with a user integrity concept of a Galileo satellite navigation system.

7. The computer program in accordance with claim 5, wherein statistical descriptions provided by the satellite navigation system regarding signal errors of each satellite are processed and a basic error for the assumed faulty satellite is determined therefrom, and the basic error is evaluated as faulty for classification of a satellite.

8. The computer program in accordance with claim 7, wherein an expected signal error or Signal in Space Accuracy SISA value for each satellite signal, and an accuracy of the estimate of the signal error or a Signal in Space Monitoring Accuracy SISMA value for each satellite signal are processed as statistical descriptions of signal errors for each satellite, wherein for each satellite the basic error TH is calculated according to the following equation:

$$TH = k_{pfa} \cdot \sqrt{SISA^2 + SISMA^2}$$

wherein the prefactor $K_{pfa}$ is determined by an allowed false alert rate.

9. An apparatus configured to determine an integrity risk at an alert limit of a position solution determined by processing signals received from satellites of a satellite navigation system, the apparatus comprising:
a receiver configured to receive signals from the satellites; and
a processor configured to
calculate a first integrity risk at the alert limit assuming that one satellite of the satellites is faulty;
determine a first position solution is determined with signals received from all of the satellites;
determine a second position solution with signals received from all of the satellites except for a signal received from the assumed faulty satellite;
determine a difference between the first and the second position solution;
create a reduced alert limit by subtracting the determined difference from the alert limit;
calculate a second integrity risk at the reduced alert limit with the signals received from all satellites except the signal received from the assumed faulty satellite;
determine the integrity risk at the alert limit using a lower of the first and second integrity risks; and
output the determined integrity risk by one of a display unit, a data output interface and an audio output unit.

10. The apparatus in accordance with claim 9, wherein the integrity risk at the alert limit is determined using the minimum of the first and second integrity risks as an unweighted contribution in accordance with a user integrity concept of a Galileo satellite navigation system.

11. The apparatus in accordance with claim 9, wherein statistical descriptions provided by the satellite navigation system regarding signal errors of each satellite are processed and a basic error for the assumed faulty satellite is determined therefrom, and the basic error is evaluated as faulty for classification of a satellite.

12. The apparatus in accordance with claim 11, wherein an expected signal error or Signal in Space Accuracy SISA value for each satellite signal, and an accuracy of the estimate of the signal error or a Signal in Space Monitoring Accuracy SISMA value for each satellite signal are processed as statistical descriptions of signal errors for each satellite, wherein for each satellite the basic error TH is calculated according to the following equation:

$$TH = k_{pfa} \cdot \sqrt{SISA^2 + SISMA^2}$$

wherein the prefactor $K_{pfa}$ is determined by an allowed false alert rate.

13. The method in accordance with claim 1, wherein outputting the determined integrity risk comprises outputting, by the data output interface, the determined integrity risk to control an automatic navigation system.

14. The apparatus in accordance with claim 9, wherein the processor is further configured to output the determined integrity risk by outputting, via the data output interface, the determined integrity risk to control an automatic navigation system.

* * * * *